United States Patent
Zhang et al.

(10) Patent No.: US 10,234,638 B2
(45) Date of Patent: Mar. 19, 2019

(54) FERRULE

(71) Applicant: FUJITSU COMPONENT LIMITED, Tokyo (JP)

(72) Inventors: Hongfei Zhang, Tokyo (JP); Osamu Daikuhara, Tokyo (JP); Shinichiro Akieda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/625,095

(22) Filed: Jun. 16, 2017

(65) Prior Publication Data

US 2018/0011260 A1 Jan. 11, 2018

(30) Foreign Application Priority Data

Jul. 5, 2016 (JP) .................. 2016-133579

(51) Int. Cl.
*G02B 6/38* (2006.01)
*G02B 6/42* (2006.01)
*G02B 6/43* (2006.01)

(52) U.S. Cl.
CPC ......... *G02B 6/3858* (2013.01); *G02B 6/4292* (2013.01); *G02B 6/43* (2013.01); *G02B 6/3885* (2013.01)

(58) Field of Classification Search
USPC .................................................. 385/78–79
See application file for complete search history.

(56) References Cited

U.S. PATENT DOCUMENTS

| | | | |
|---|---|---|---|
| 5,499,310 A * | 3/1996 | Ueda ................ | G02B 6/3846 385/84 |
| 9,250,397 B2 | 2/2016 | Akabane et al. | |
| 2010/0014815 A1 * | 1/2010 | Ohmura ............. | G02B 6/3846 385/83 |
| 2013/0011100 A1 | 1/2013 | Shiraishi | |
| 2015/0023636 A1 | 1/2015 | Moriyama et al. | |
| 2015/0309269 A1 | 10/2015 | Daikuhara et al. | |
| 2015/0346438 A1 * | 12/2015 | Kato ................. | G02B 6/3897 385/59 |
| 2016/0282568 A1 * | 9/2016 | Nishimura ........ | G02B 6/3885 |

FOREIGN PATENT DOCUMENTS

| | | |
|---|---|---|
| JP | 2013-020027 | 1/2013 |
| JP | 2015-022125 | 2/2015 |
| JP | 2015-022130 | 2/2015 |
| JP | 2015-023143 | 2/2015 |

* cited by examiner

Primary Examiner — Eric Wong
(74) Attorney, Agent, or Firm — IPUSA, PLLC

(57) ABSTRACT

A ferrule includes a ferrule body having a first opening formed in a side face thereof, and having a second opening formed in a top face thereof, wherein the first opening is configured to receive an optical waveguide inserted into the ferrule body at the side face, and wherein the second opening is formed over and in communication with the first opening, such that the second opening connects an inner space of the first opening to an outside of the ferrule body.

8 Claims, 14 Drawing Sheets

FERRULE

BACKGROUND OF THE INVENTION

1. Field of the Invention

The disclosures herein relate to a ferrule.

2. Description of the Related Art

High-speed interface for supercomputers and high-end servers has been increasingly employing optical communications because of its capacity to achieve high-speed signal transmission and to increase transmission distance.

Next generation interface studied for use in such standards as 100G Ethernet (registered trademark) and IBTA EDR (registered trademark) providing a long transmission distance such as a few dozen meters employs optical communications, and also uses optical modules for converting electrical signals into optical signals. Optical modules, which couple optical cables to servers or the like, convert optical signals from optical cables into electrical signals for outputting to servers, and also convert electrical signals from servers into optical signals for outputting to optical cables.

Optical modules have a light emitting device for converting an electrical signal into an optical signal, a light receiving device for converting an optical signal into an electrical signal, a driver IC (integrated circuit) for driving the light emitting device, and a TIA (trans impedance amplifier) for converting electric current into voltage. The light emitting device, the light receiving device, the driver IC, and the TIA are mounted on a printed circuit board inside the housing. Optical waveguides which are formed as a flexible sheet provide coupling between the light emitting device, the light receiving device, and a ferrule such as a lens ferrule.

The optical waveguide sheet is inserted into the slit of a lens ferrule, and is bounded therein with adhesive. The thickness of the slit is designed to be slightly greater than the thickness of the optical waveguide in consideration of tolerance. Warpage of the optical waveguide inside the slit may thus hinder the mounting of the optical waveguide at desired position inside the slit. The lens ferrule and the optical waveguide are required to be fastened with each other at the desired position such that light from the optical guide enters the lens of the lens ferrule, and such that light condensed by the lens enters the core of the optical guide. The optical waveguide fastened to the lens ferrule away from the desired position gives rise to light loss, thereby hindering optical communication.

It may be desired to provide a ferrule that allows an optical waveguide to be fastened at desired position.

RELATED-ART DOCUMENTS

Patent Document

[Patent Document 1] Japanese Patent Application Publication No. 2015-23143
[Patent Document 2] Japanese Patent Application Publication No. 2015-22130
[Patent Document 3] Japanese Patent Application Publication No. 2015-22125
[Patent Document 4] Japanese Patent Application Publication No. 2013-20027

SUMMARY OF THE INVENTION

It is a general object of the present invention to provide a ferrule that substantially obviates one or more problems caused by the limitations and disadvantages of the related art.

According to one embodiment, a ferrule includes a ferrule body having a first opening formed in a side face thereof, and having a second opening formed in a top face thereof, wherein the first opening is configured to receive an optical waveguide inserted into the ferrule body at the side face, and wherein the second opening is formed over and in communication with the first opening, such that the second opening connects an inner space of the first opening to an outside of the ferrule body.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments for implementing the invention will be described. The same members or the like are referred to by the same numerals, and a description thereof will be omitted.

Figure 1A:
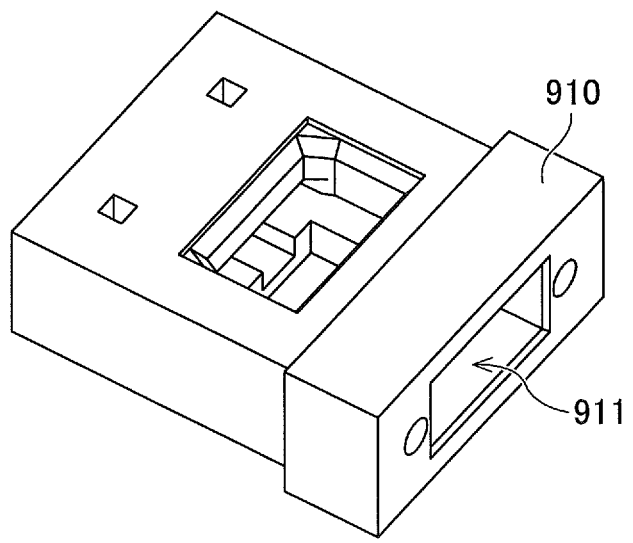
FIGS. 1A and 1B are drawings illustrating a lens ferrule.
Figure 1B:
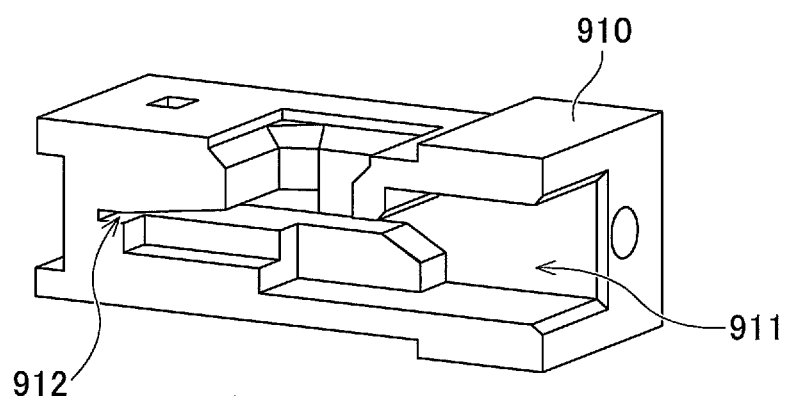
Figure 2A:
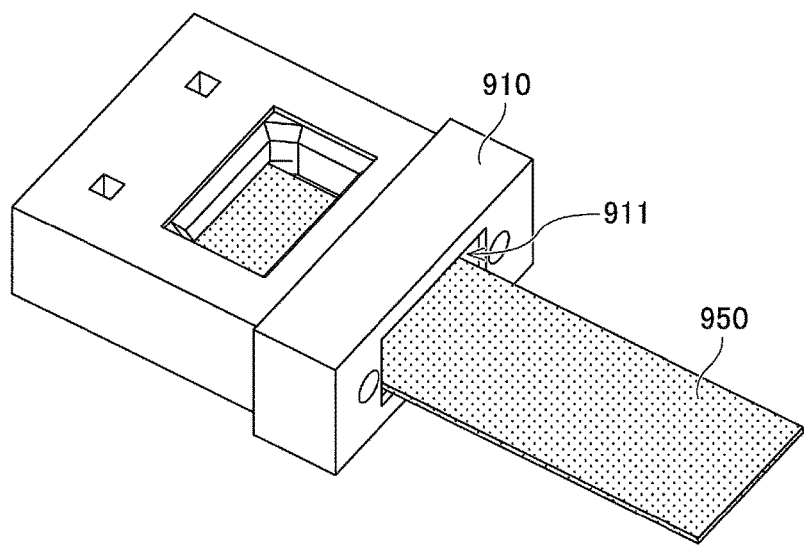
FIGS. 2A and 2B are drawings illustrating a lens ferrule.
Figure 2B:
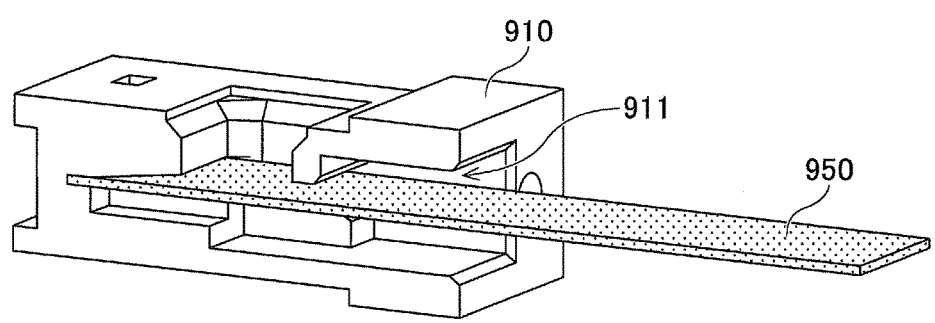

By referring to FIGS. 1A and 1B and FIGS. 2A and 2B, a description will be given below with respect to the case in which an optical waveguide inserted into the slit of a lens ferrule fails to be fastened at desired position. FIG. 1A is an axonometric view of a lens ferrule. FIG. 1B is an axonometric cross-sectional view of the lens ferrule. FIG. 2A is an axonometric view of a lens ferrule having an optical guide placed therein. FIG. 2B is an axonometric cross-sectional view of the lens ferrule of FIG. 2A.

A lens ferrule 910 is made of a resin material such as COP (i.e., cycloolefin polymer) resin by resin molding using a mold. An optical waveguide sheet 950, which is made of a resin material, has one or more cores transmitting light and covered with a clad. The same arrangement is used for the examples that will be described herein.

The lens ferrule 910 has an opening 911 for receiving the optical waveguide sheet 950, and also has, at the back end of the opening 911, a slit 912 into which the end of the optical waveguide sheet 950 is inserted. The optical waveguide sheet 950 is secured with adhesive inside the slit 912 with the end thereof abutting the back end of the slit 912.

The thickness of the optical waveguide sheet 950 exhibits some variation. In consideration of this, the thickness (i.e., height) of the slit 912 is designed to be slightly greater than the thickness of the optical waveguide sheet 950 to allow the optical waveguide sheet 950 to be reliably inserted into the slit 912. For example, the thickness of the slit 912 is 108 micrometers, and the thickness of the optical waveguide sheet 950 is 105 micrometers. The thickness of the slit refers to the dimension of the slit measured in the same direction as the thickness direction of the optical waveguide.

A mold is used for molding the lens ferrule 910. Thinning the portion of the mold corresponding to the slit for the purpose of thinning the slit 912 may result in this portion of the mold being undesirably warped at the time of molding the ferrule. This may result in a failure to form the slit 912 with high precision. This portion of the mold thus needs to have a certain thickness, which prevents the slit 912 from being sufficiently thin.

Since the thickness of the optical waveguide sheet 950 is 3 micrometers thinner than the thickness of the slit 912, the optical waveguide sheet 950 may shift vertically inside the slit 912, causing warpage of the optical waveguide sheet 950. Warpage of the optical waveguide sheet 950 inside the slit 912 causes the optical waveguide sheet 950 to be fastened inside the slit 912 away from the desired position, thereby causing part or all of the light exiting from the optical waveguide sheet 950 to fail to enter the lenses of the lens ferrule 910, or causing part or all of the light condensed by the lenses of the lens ferrule 910 to fail to enter the cores of the optical waveguide sheet 950. As a result, light loss occurs, which undermines optical communication.

As was previously noted, the lens ferrule 910 is made by resin molding using a mold. The portion of the mold for making the slit 912 is 108 micrometers in thickness, and is thus easy to bend. Warpage of the portion of the mold for making the slit 912 at the time of resin molding results in the slit 912 being formed at an incorrect position in the lens ferrule 910. Displacement of the slit 912 from the desired position causes the contact points of the optical waveguide sheet 950 to be also displaced, resulting in light loss, lowered reliability, and lowered yield.

First Embodiment

Figure 3A:
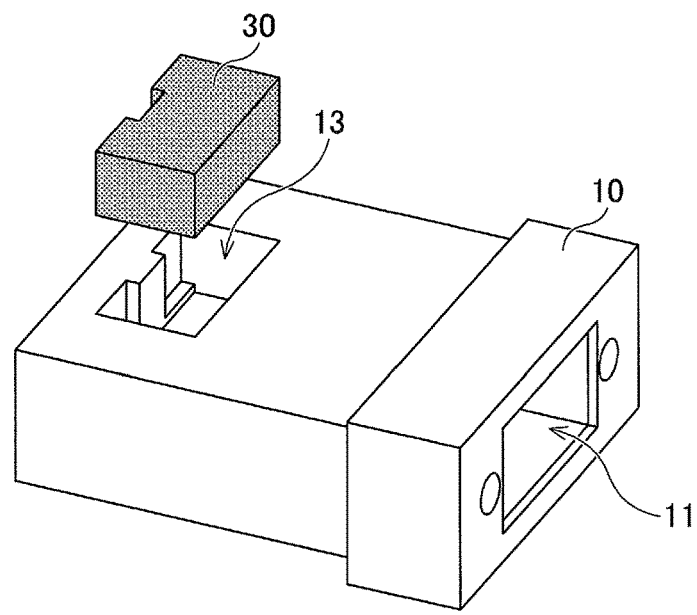
FIGS. 3A and 3B are drawings illustrating a lens ferrule of a first embodiment.
Figure 3B:
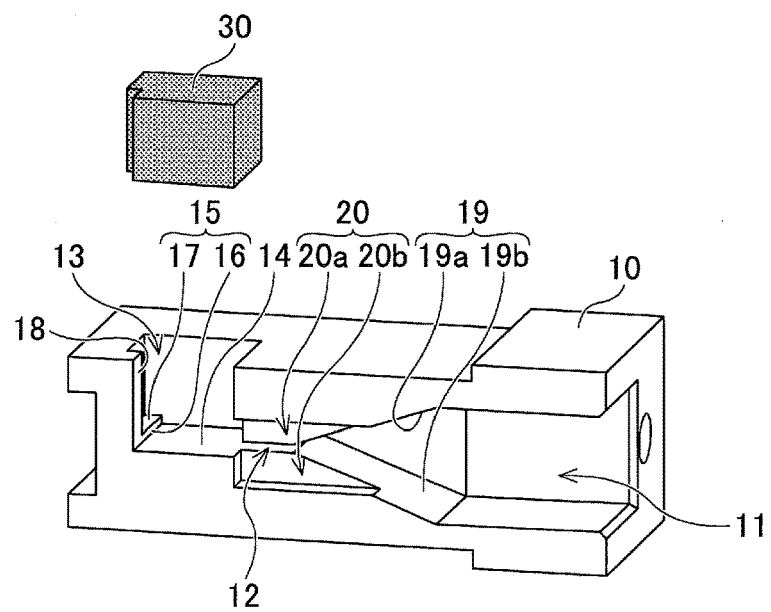
Figure 4A:
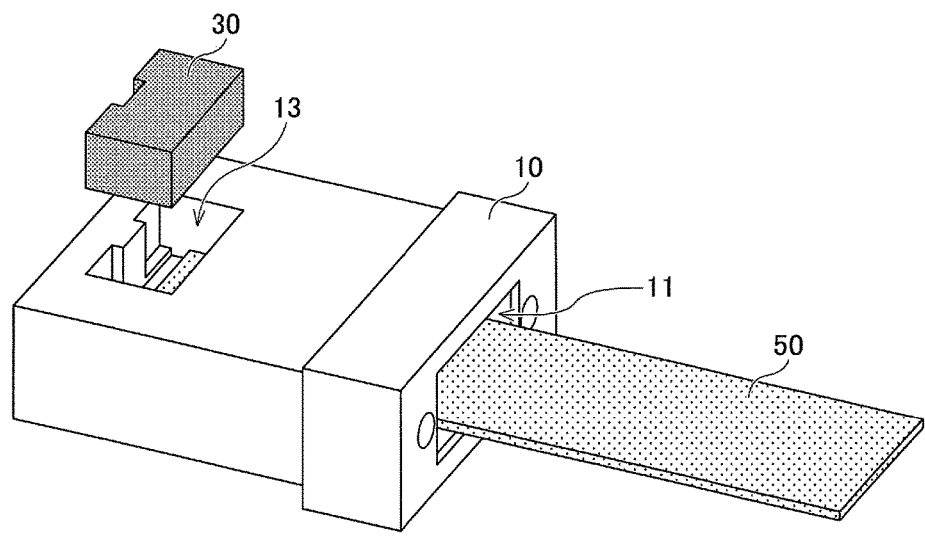
FIGS. 4A and 4B are drawings illustrating the lens ferrule of the first embodiment.
Figure 4B:
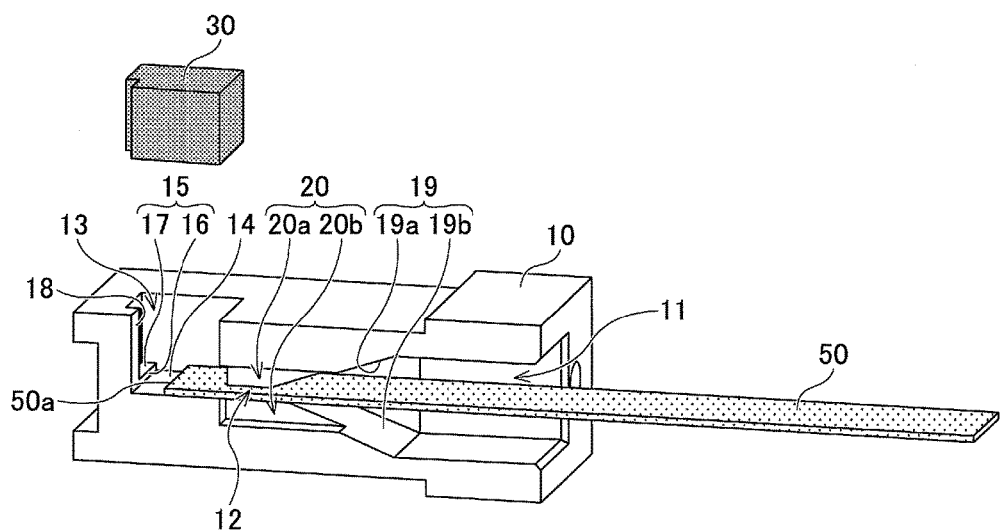
Figure 5A:
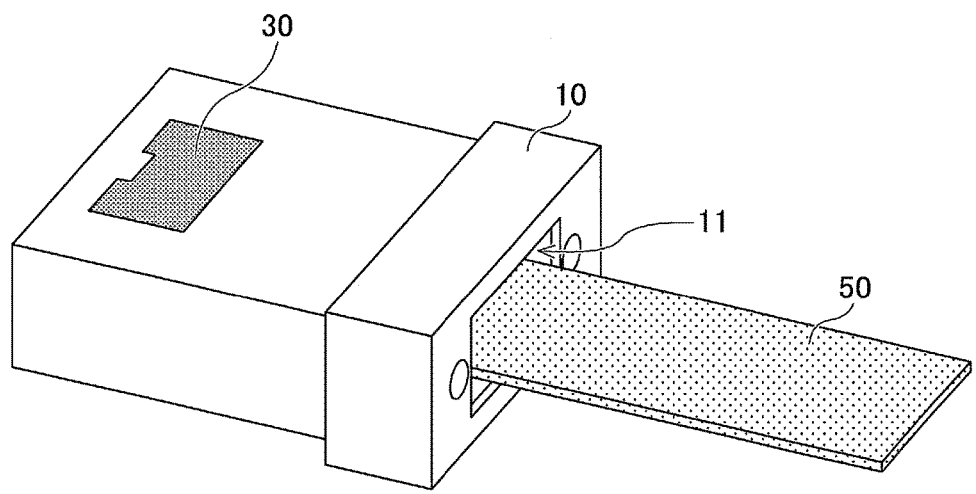
FIGS. 5A and 5B are drawings illustrating the lens ferrule of the first embodiment.
Figure 5B:
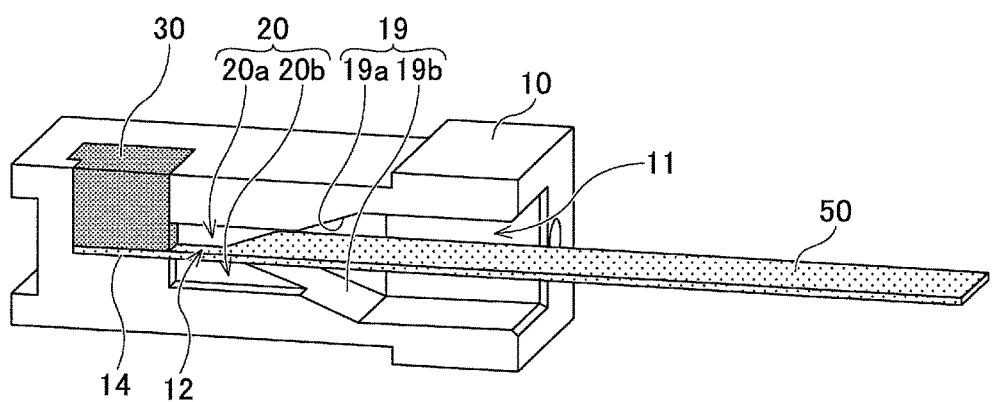

In the following, a lens ferrule of the first embodiment will be described by referring to FIGS. 3A and 3B through FIGS. 5A and 5B. FIG. 3A is an axonometric view of a lens ferrule according to the present embodiment. FIG. 3B is an axonometric cross-sectional view of the lens ferrule of FIG. 3A. FIG. 4A is an axonometric view of the lens ferrule into which an optical waveguide is inserted halfway through. FIG. 4B is an axonometric cross-sectional view of the lens ferrule of FIG. 4A. FIG. 5A is an axonometric view of the lens ferrule to which an optical waveguide is coupled. FIG. 5B is an axonometric cross-sectional view of the lens ferrule of FIG. 5A.

The lens ferrule of the present embodiment includes a ferrule body 10 and a pressing member 30.

The ferrule body 10 has an opening 11 for receiving an optical waveguide 50, and also has a slit 12 at the back end of the opening 11. Further, the back face of the slit 12 has an upper opening 13 opening upwardly. The opening 11 and the upper opening 13 communicate with each other. Although not illustrated, lenses are disposed on the back face of the ferrule body 10 at the position corresponding to the cores of an optical waveguide 50. The pressing member 30 serves to press the optical waveguide 50 from above in the ferrule body 10.

The slit 12 has a thickness (i.e., height) equal to, or slightly smaller than, the thickness of the optical waveguide 50, such that the optical waveguide 50 inserted into the slit 12 does not disengage (i.e., fall off). The ferrule body 10 and the pressing member 30 are made of a resin material such as the COP resin by resin molding using a mold. An optical waveguide sheet 50, which is made of a resin material, has one or more cores transmitting light and covered with a clad.

The face of the upper opening 13 with which an end 50a of the optical waveguide 50 comes in contact has a step 15 formed thereon. The step 15 has a step lateral face 16 perpendicular to a bottom face 14 of the upper opening 13 and a step upper face 17 parallel to the bottom face 14 of the upper opening 13. As the optical waveguide 50 is inserted into the opening 11, the end 50a of the optical waveguide 50 comes in contact with the step lateral face 16. In this state, the optical waveguide 50 is in its intended position, and the step 15 is formed to achieve such positioning. The step lateral face serves as a contact face that comes in contact with the end 50a of the optical waveguide 50. The height of the step 15, i.e., the height of the step lateral face 16, is substantially the same as the thickness of the optical waveguide 50.

The face of the upper opening 13 with which the end 50a of the optical waveguide 50 comes in contact has at the center thereof a bulging face 18 bulging toward the inside of the upper opening 13. The face of the bulging face 18 coming in contact with the end 50a of the optical waveguide 50 is flush with the step lateral face 16. This serves to prevent the end 50a of the optical waveguide 50 from exceeding the step lateral face 16 when the optical waveguide 50 is inserted into the opening 11.

The provision of the bulging face 18 ensures that the optical waveguide 50 inserted into the opening 11 stops when the end 50a of the optical waveguide 50 comes in contact with the step lateral face 16.

The opening 11 has a slope part 19 whose vertical gap (i.e., height) gradually decreases toward the slit 12 away from the entrance of the opening 11. The slope part 19 has an upper slope face 19a and a lower slope face 19b. The upper slope face 19a and the lower slope face 19b are symmetric with each other with respect to the center line defined by the optical waveguide 50 inserted into the opening 11. The symmetric structure of the upper slope face 19a and the lower slope face 19b is provided for the purpose of easy insertion of the optical waveguide 50 into the slit 12. An asymmetric structure of the upper slope face 19a and the lower slope face 19b may lead to the occurrence of thickness variation when the ferrule body 10 is formed by resin molding. The symmetric structure of the upper slope face 19a and the lower slope face 19b serves to prevent the occurrence of thickness variation, thereby providing a lens ferrule with high evenness.

The center of the area where the slit 12 is formed has a space serving as a slit rib 20. The position at which the slit rib 20 is formed has a greater height (i.e., vertical gap length) than the slit 12. The slit rib 20 includes an upper slit rib 20a and a lower slit rib 20b. With the optical waveguide 50 being in the inserted position, the upper slit rib 20a and the lower slit rib 20b are vertically symmetric with each other with respect to the center line defined by the optical waveguide 50. Since the thickness of the slit 12 is small, the mold used for making the ferrule body 10 has a portion corresponding to the slit 12 that is easy to bend. The provision of the slit rib 20 in the lens ferrule of the present embodiment serves to thicken part of the portion of the mold corresponding to the slit 12, thereby making the portion of the mold for making the slit 12 more robust against warpage.

The upper opening 13 is formed on the opposite side of the ferrule body 10 from where the opening 11 is situated. The optical waveguide 50 is pressed between the pressing member 30 and the bottom face 14 at the position of the upper opening 13. It may be noted that a slit is nonexistent in the area where the upper opening 13 is formed. In the present embodiment, thus, there is not much need to ensure the precision of slit formation at the position where the end 50a of the optical waveguide 50 is placed.

In the following, a description will be given with respect to the process steps for coupling the optical waveguide 50 to the lens ferrule of the present embodiment. First, adhesive is applied to the internal faces of the opening 11. Next, the optical waveguide 50 is inserted into the opening 11 as illustrated in FIGS. 4A and 4B. As the optical waveguide 50 is inserted into the opening 11, the optical waveguide 50 is guided by the upper slope face 19a and the lower slope face 19b situated at the back of the opening 11 to enter the slit 12. The thickness of the slit 12 is the same as, or slightly smaller than, the thickness of the optical waveguide 50. Since the optical waveguide 50 made of a resin material is soft, the optical waveguide 50 is able to reach deep into the slit 12.

As the optical waveguide 50 is further inserted deep into the opening 11, the end 50a of the optical waveguide 50 exits from the slit 12 to travel on the bottom face 14 in the upper opening 13, and comes to a stop upon making a contact with the step lateral face 16. Since the bulging face 18 is present on the lateral face of the upper opening 13, the optical waveguide 50 does not go beyond the step lateral face 16. Further, the slit 12 having a thickness slightly smaller than the thickness of the optical waveguide 50 serves to temporarily fix the optical waveguide 50, thereby being able to maintain the condition in which the end 50a of the optical waveguide 50 is in contact with the step lateral face 16.

Subsequently, the pressing member 30 is inserted into the upper opening 13 as illustrated in FIGS. 5A and 5B. Horizontal movement of the pressing member 30 placed in the upper opening 13 illustrated in FIGS. 5A and 5B is restricted. The optical waveguide 50 is placed in the opening 11 of the lens ferrule to extend on the bottom face 14 and to have the end 50a in contact with the step lateral face 16. Inserting the pressing member 30 in the upper opening 13 causes the optical waveguide 50 to be pressed between the pressing member 30 and the bottom face 14 to be secured at the desired position. When the pressing member 30 is inserted into the upper opening 13, the left-hand end of the bottom face of the pressing member 30 in FIGS. 4A and 4B comes in with the step upper face 17. The height of the step 15 of the present embodiment is designed to be substantially the same as the thickness of the optical waveguide 50. As the above-noted portion of the bottom face of the pressing member 30 comes in contact with the step upper face 17, the pressing force of the pressing member 30 is not excessively applied to the optical waveguide 50, thereby preventing warpage of the optical waveguide 50. In this state, the optical waveguide 50 is fastened with adhesive.

<Production Method>

In the following, a description will be given of the making of the lens ferrule according to the present embodiment. The lens ferrule of the present embodiment is made by use of molds. Specifically, a mold for making the ferrule body 10 and a mold for making the pressing member 30 are used to produce the ferrule body 10 and the pressing member 30, respectively.

The mold for making the pressing member 30 has a hole having the same shape as the pressing member 30. Resin material is poured into the mold, and is cured to make the pressing member 30.

Figure 6A:
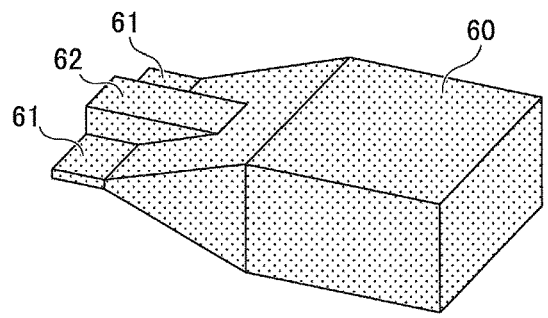
FIGS. 6A through 6C are drawings illustrating a method of making the lens ferrule according to the first embodiment.
Figure 6B:
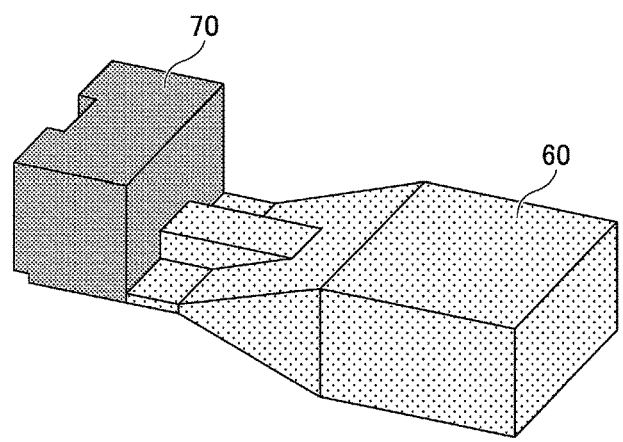
Figure 6C:
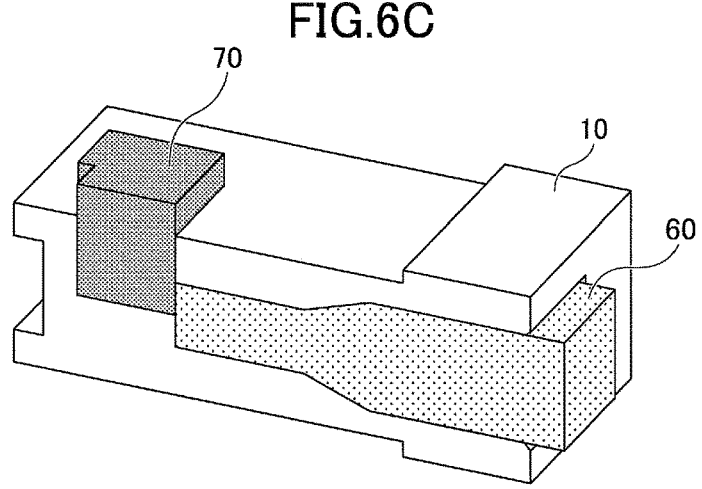

The mold for making the ferrule body 10 includes a mold (not shown) for making the outer shape of the ferrule body 10, a mold 60 having the same shape as the opening 11 as illustrated in FIGS. 6A through 6C, and a mold 70 having the same shape as the upper opening 13. The mold 70 is for making the upper opening 13 in the ferrule body 10.

In order to make the ferrule body 10, the mold 60 illustrated in FIG. 6A is arranged at a desired position relative to the mold for making the outer shape of the ferrule body 10. The mold 70 is then arranged at a desired position relative to the mold 60 and the mold (not shown) for making the outer shape of the ferrule body 10 as illustrated in FIG. 6B. In this state, the mold 70 is situated immediately alongside the mold 60 as illustrated in FIG. 6B. Subsequently, resin material is poured into the mold and cured, so that the resin material covers the mold 60 and the mold 70 as illustrated in FIG. 6C. FIG. 6C is an axonometric cross-sectional view of the ferrule body 10 as observed after the mold for making the outer shape of the ferrule body 10 is removed. The mold 60 and the mold 70 are then removed to produce the ferrule body 10.

The mold 60 has a slit forming portion 61 for making the slit 12 and a rib forming portion 62 for making the slit rib 20. The rib forming portion is situated at the center of the slit forming portion 61. The thickness of the slit forming portion 61 is as thin as approximately 105 micrometers or less, and is thus easy to warp. The mold 60 of the present embodiment has an increased thickness at the rib forming portion 62, thereby avoiding warpage of the slit forming portion 61 at the time of pouring resin material around the mold 60.

Second Embodiment

Figure 7A:
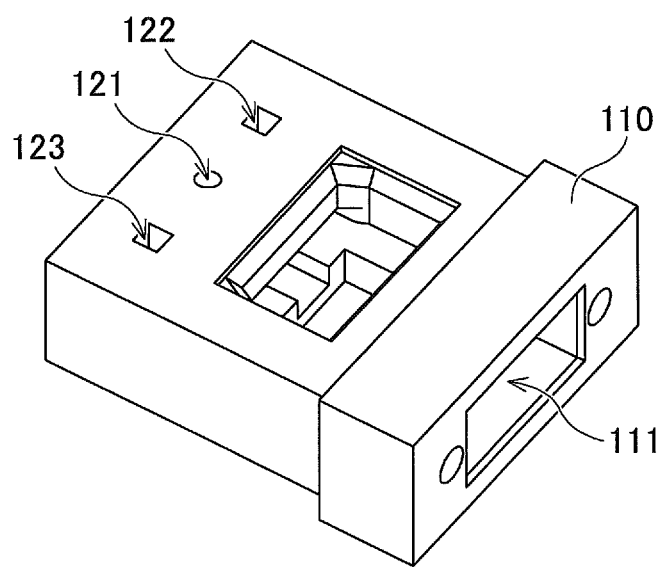
FIGS. 7A and 7B are drawings illustrating a lens ferrule of a second embodiment.
Figure 7B:
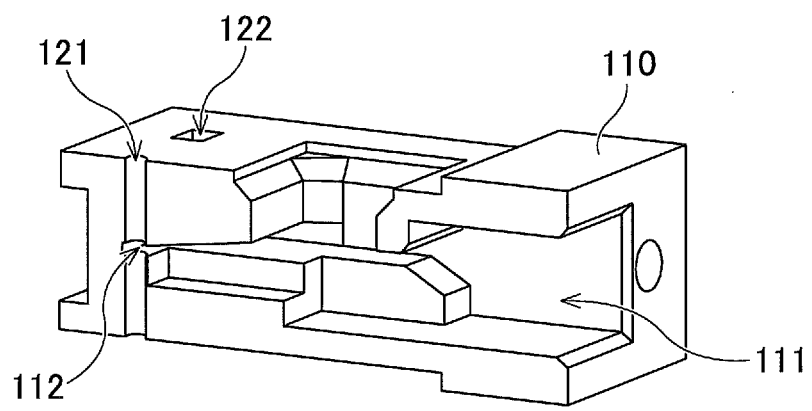

In the following, a description will be given of a lens ferrule according to a second embodiment. FIG. 7A is an axonometric view of a lens ferrule according to the present embodiment. FIG. 7B is an axonometric cross-sectional view of the lens ferrule of FIG. 7A.

As was previously described, the thickness of the slit receiving an optical waveguide in a lens ferrule is small, so that the portion of a mold for making the slit is thin and easy to warp. As a result, the thin portion of the mold for making a slit may warp at the time of making a lens ferrule, resulting in the slit being formed at a displaced position. In such a case, coupling an optical waveguide to such a produced lens ferrule may not produce desired characteristics.

A lens ferrule 110 of the present embodiment includes an opening 111 and a slit 112 situated at the back of the opening 111. A penetrating hole 121 is vertically formed to penetrate through the lens ferrule 110 at the center of the slit 112, and penetrating holes 122 and 123 are vertically formed to penetrate through the lens ferrule 110 near the side ends of the slit 112.

In the following, a description will be given of a method of making the lens ferrule 110 according to the present embodiment. The lens ferrule 110 is made by using a mold (not shown) for making the outer shape of the lens ferrule 110, a mold 160 having the same shape as part of the opening 111 as illustrated in FIG. 8A, cylindrical pins 171a and 171b disposed on and beneath the mold 160, respectively, for making the penetrating hole 121, quadrangular prisms 172a and 172b disposed on and beneath the mold 160, respectively, for making the penetrating hole 122, and quadrangular prisms 173a and 173b disposed on and beneath the mold 160, respectively, for making the penetrating hole 123.

Figure 8A:
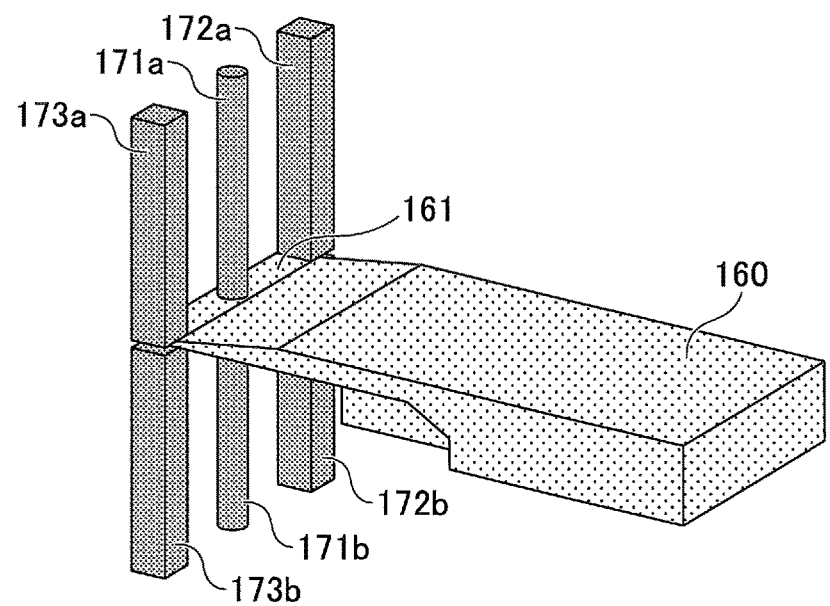
FIGS. 8A and 8B are drawings illustrating a method of making the lens ferrule according to the second embodiment.

As illustrated in FIG. 8A, the mold 160 is arranged at a desired position relative to the mold for making the outer shape of the ferrule body 10, followed by placing the pins 171a and 171b such that the center of a thin portion 161 of the mold 160 for making the slit 112 is placed between the pins 171a and 171b. Further, the pins 172a and 172b are placed to hold therebetween one of the side ends of the portion 161 of the mold 160 for making the slit 112, and the pins 173a and 173b are placed to hold therebetween the other one of the side ends.

Figure 8B:
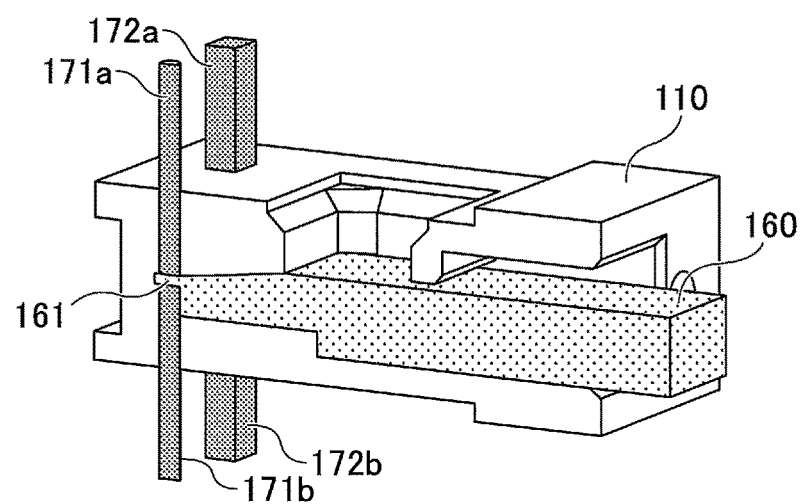

Subsequently, resin material is poured around the mold 160 such that the resin material covers the portion 161 of the mold 160 as illustrated in FIG. 8B. FIG. 8B is an axonometric cross-sectional view of the lens ferrule 110 as observed without the mold for making the outer shape thereof.

The resin material is then cured, followed by removing the mold for making the outer shape of the lens ferrule 110, the mold 160, the pins 171a, 171b, 172a, 172b, 173a, and 173b, thereby producing the lens ferrule 110.

In the present embodiment, the portion 161 for making the slit 112 is placed and held between the pins 171a and 171b at the center, between the pins 172a and 172b at or near one side end thereof, and between the pins 173a and 173b at or near the other side end, which prevents warpage of the portion 161, and allows the slit 112 to be formed at the desired position with high precision.

In the present embodiment, the penetrating hole 121 allows excessive adhesive and bubbles in the adhesive to escape. By referring to FIGS. 9A through 9C, a process step of connecting the optical waveguide 50 to the lens ferrule 110 will be described.

Figure 9A:
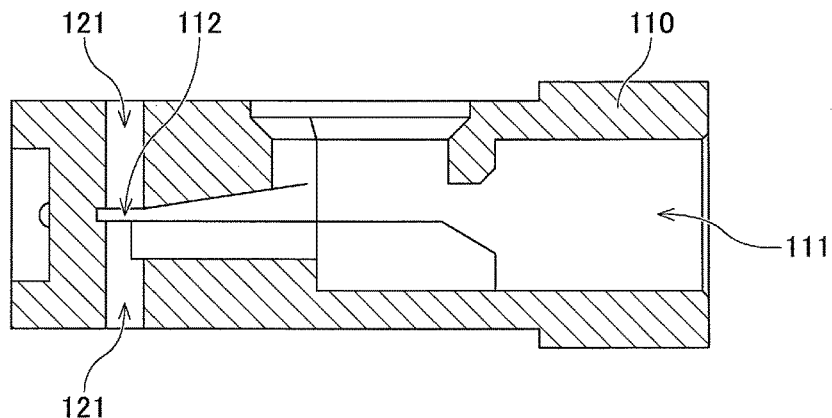
FIGS. 9A through 9C are drawings illustrating the coupling of an optical waveguide to the lens ferrule of the second embodiment.
Figure 9B:
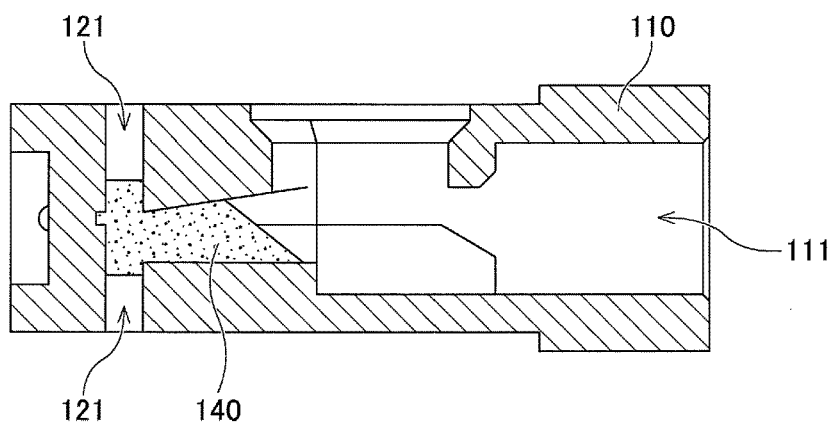
Figure 9C:
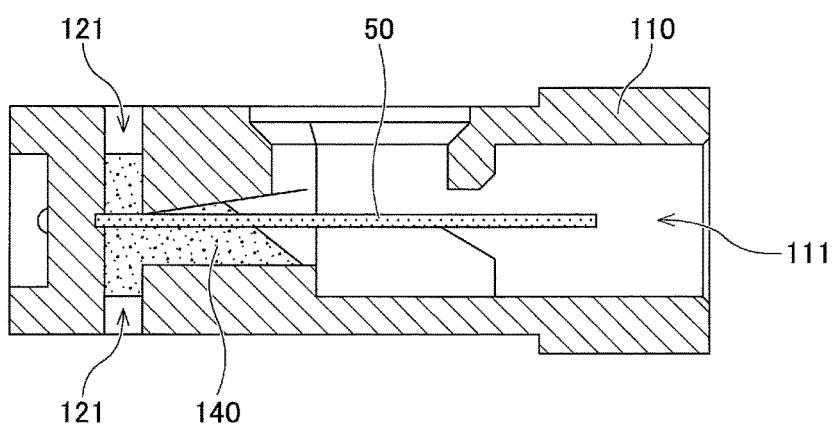

The opening 111 inclusive of the slit 112 illustrated in FIG. 9A is provided with adhesive 140 as illustrated in FIG. 9B. The adhesive 140 enters the penetrating hole 121 extending over and under the slit 112. At this time, bubbles may be formed inside the adhesive 140. Subsequently, the optical waveguide 50 is inserted into the slit 112 as illustrated in FIG. 9C, which causes the adhesive 140 inside the slit 112 to flow into the penetrating hole 121. Bubbles contained in the adhesive 140 also move toward the penetrating hole 121 together with the adhesive 140. Inserting the optical waveguide 50 into the slit 112 causes the adhesive 140 inside the slit 112 to be extruded into the penetrating hole 121, so that insertion of the optical waveguide 50 into the slit 112 is smoothly conducted. The adhesive 140 is thereafter cured, which allows the optical waveguide 50 to be securely connected to the lens ferrule 110.

Third Embodiment

Figure 10A:
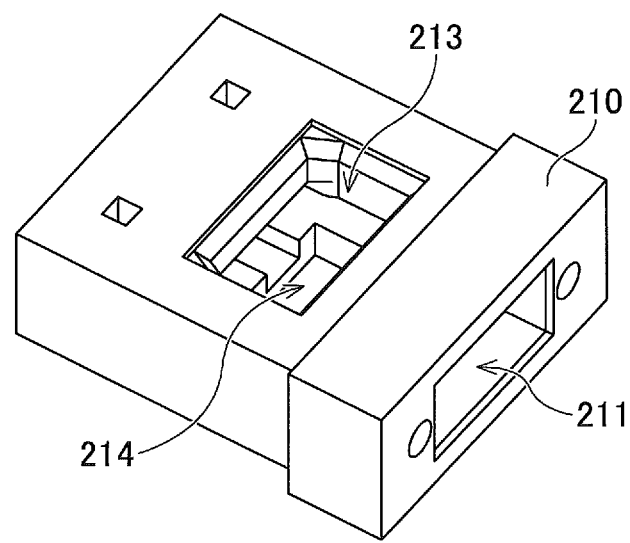
FIGS. 10A and 10B are drawings illustrating a lens ferrule of a third embodiment.
Figure 10B:
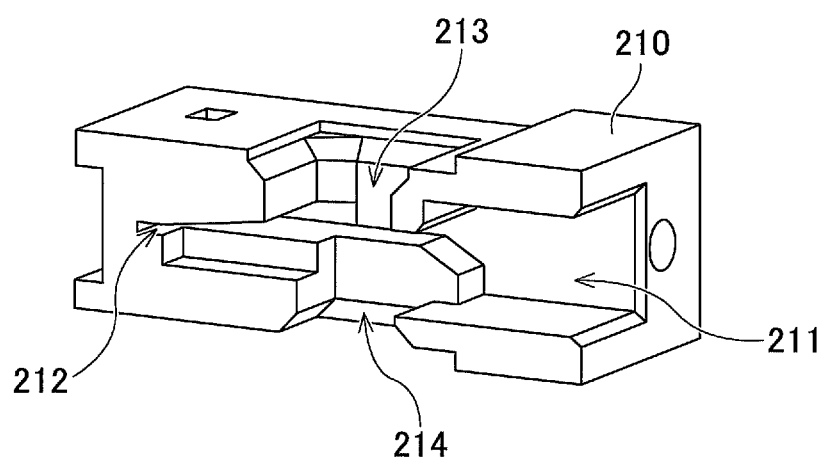

In the following, a lens ferrule of the third embodiment will be described by referring to FIGS. 10A and 10B. FIG. 10A is an axonometric view of a lens ferrule according to the present embodiment. FIG. 10B is an axonometric cross-sectional view of the lens ferrule of FIG. 10A. The lens ferrule of the present embodiment is formed while a mold for making an opening is held between other molds placed over and under the mold.

A lens ferrule 210 of the present embodiment has an opening 211 and a slit 212. An upper opening 213 is formed over the opening 211, and a lower opening 214 is formed under the opening 211.

Figure 11:
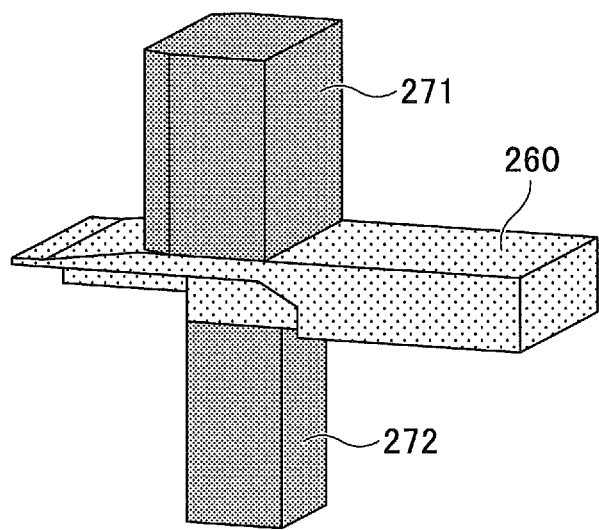
FIG. 11 is a drawing illustrating molds for making the lens ferrule according to the third embodiment.

The lens ferrule 210 is formed by using a mold (not shown) for making the outer shape of the lens ferrule 210, a mold 260 having the same shape as part of the opening 211 as illustrated in FIG. 11, an upper mold 271 disposed on the mold 260 for making the upper opening 213, and a lower mold 272 disposed beneath the mold 260 for making the lower opening 214.

The mold 260 is arranged at the desired position for making the opening 211 relative to the mold for making the outer shape of the lens ferrule 210, followed by placing the upper mold 271 on the mold 260, and placing the lower mold 272 beneath the mold 260. As a result, the mold 260 is placed and held between the upper mold 271 and the lower mold 272, so that the mold 260 is securely positioned relative to the outer mold.

Subsequently, resin material is poured into and around the molds, and is then cured, followed by removing the mold for making the outer shape of the lens ferrule 210, the mold 260, the upper mold 271, and the lower mold 272 to produce the lens ferrule 210. In the present embodiment, resin material is poured and cured while the mold 260 is placed and held between the upper mold 271 and the lower mold 272. The mold 260 is thus securely held between the upper mold 271 and the lower mold 272 to allow the slit 212 to be formed at the desired position with high precision.

Fourth Embodiment

Figure 12A:
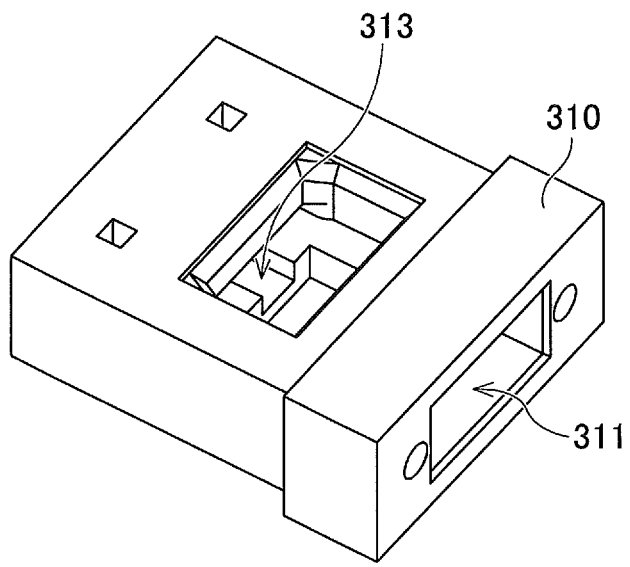
FIGS. 12A and 12B are drawings illustrating a lens ferrule of a fourth embodiment.
Figure 12B:
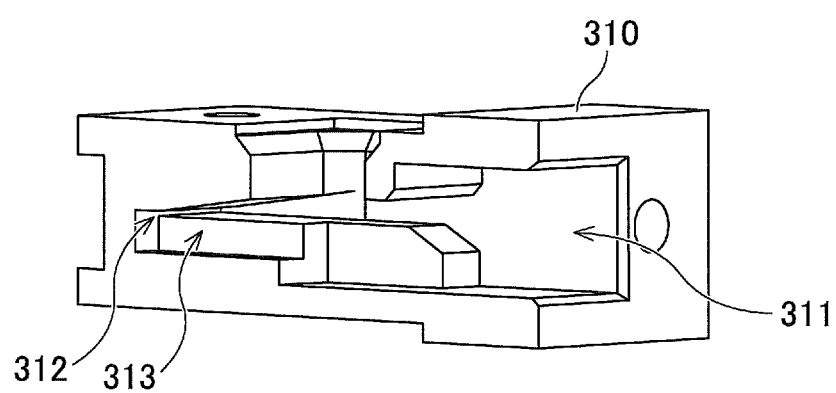

In the following, a lens ferrule of the fourth embodiment will be described by referring to FIGS. 12A and 12B. FIG. 12A is an axonometric view of a lens ferrule according to the present embodiment. FIG. 12B is an axonometric cross-sectional view of the lens ferrule of FIG. 12A.

A lens ferrule 310 of the present embodiment has an opening 311 and a slit 312. The area where the slit 312 is formed has a slit rib 313 that is a space extending downwardly at the center of the slit 312 in the width direction in FIG. 12A. The slit rib 313 extends to the back face of the slit 312 with which the end of an optical waveguide comes in contact.

Figure 13:
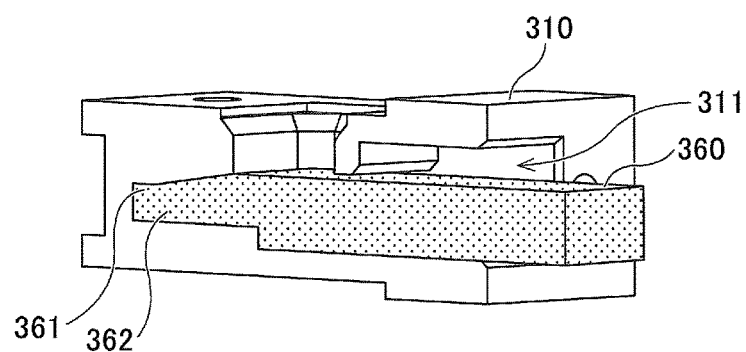
FIG. 13 is a drawing illustrating a method of making the lens ferrule according to the fourth embodiment.

The lens ferrule 310 is made by resin molding using a mold (not shown) for making the outer shape of the lens ferrule 310 and a mold 360 having the same shape as part of the opening 311 as illustrated in FIG. 13. The mold 360 has a slit forming portion 361 corresponding to the slit 312 and a slit rib forming portion 362 corresponding to the slit rib 313. As for the thickness of the mold 360, the slit rib forming portion 362 is thicker than the slit forming portion 361. FIG. 13 is an axonometric cross-sectional view of the lens ferrule 310 as observed after pouring resin material and removing the mold for making the outer shape of the lens ferrule 310.

The mold 360 is properly arranged relative to the mold for making the outer shape of the lens ferrule 310, and, then, resin material is poured and cured, followed by removing the mold 360 to produce the lens ferrule 310 having the opening 311.

The slit rib forming portion 362 of the mold 360 is thick and robust against warpage. The provision of the slit rib forming portion 362 under the slit forming portion 361 is thus able to reduce warpage of the thin slit forming portion 361 also.

Fifth Embodiment

Figure 14A:
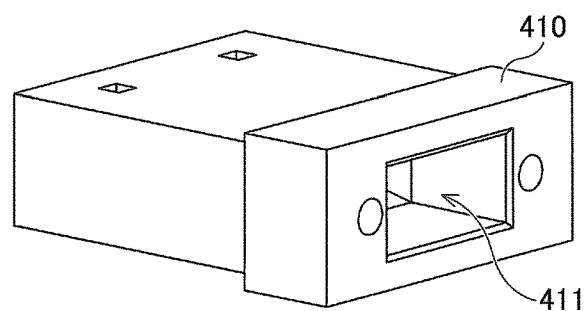
FIGS. 14A and 14B are drawings illustrating a lens ferrule of a fifth embodiment.
Figure 14B:
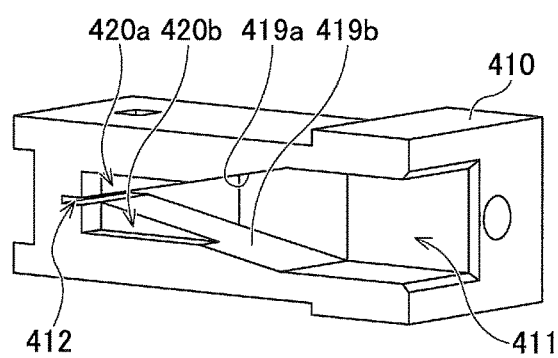

In the following, a lens ferrule of the fifth embodiment will be described by referring to FIGS. 14A and 14B. FIG. 14A is an axonometric view of a lens ferrule according to the present embodiment. FIG. 14B is an axonometric cross-sectional view of the lens ferrule of FIG. 14A. A lens ferrule of the present embodiment is symmetric with respect to the center line defined by an optical waveguide.

A lens ferrule 410 made of the COP resin or the like has an opening 411 and a slit 412. The opening 411 has an upper slope face 419a and a lower slope face 419b such that the height (i.e., vertical gap) of the opening 411 gradually decreases toward the slit 412 situated at the back of the opening 411 away from the entrance. The upper slope face 419a and the lower slope face 419b are vertically symmetric with each other. In the present embodiment, the upper slope face 419a and the lower slope face 419b are flat plane face. The provision of the upper slope face 419a and the lower slope face 419b allows an optical waveguide inserted into the opening 411 to be smoothly guided toward the slit 412.

In the case of the temperature for forming the lens ferrule 410 being 80 degrees Celsius, for example, the lens ferrule 410 may suffer stress caused by curing contraction or the like during the curing process in which the temperature is dropped from 80 degrees Celsius to room temperature. The symmetrical structure of the upper slope face 419a and the lower slope face 419b ensures that the distribution of applied stress at the time of forming the lens ferrule 410 is also symmetric, thereby reducing warpage of the lens ferrule 410.

Stress may concentrate on corners to cause a crack at such corners. The upper slope face 419a and the lower slope face 419b are flat plane faces without any corners at which stress would concentrate, so that cracks caused by concentration of stress may be reduced.

An upper rib 420a is formed from halfway through the upper slope face 419a to the slit 412, and a lower rib 420b is formed from halfway through the lower slope face 419b to the slit 412. The upper rib 420a and the lower rib 420b formed as described above are vertically symmetric with each other.

Figure 15:
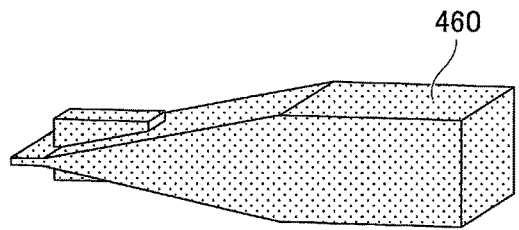
FIG. 15 is a drawing illustrating a mold for making the lens ferrule according to the fifth embodiment.

The lens ferrule 410 is made by using a mold (not shown) for making the outer shape thereof and a mold 460 having the same shape as the opening 411. An end of the mold 460 on the left-hand side of FIG. 15 has a slit forming portion for making the slit 412. Lib forming portions for making the upper rib 420a and the lower rib 420b are provided above and below, respectively, the rib forming portion. The combined thickness of the rib forming portions is greater than the thickness of the slip forming portion, which provides robustness against warpage, thereby preventing warpage of the slip forming portion.

The mold 460 is arranged relative to the outer mold (not shown) such as to form the opening 411 at the desired position, and, then, resin material is poured around and into the molds and cured, followed by removing the mold 460 to produce the lens ferrule 410. The symmetric structure of the mold 460 of the present embodiment reduces thickness variation of resin material, thereby serving to produce a lens ferrule having a desired shape with high evenness.

According to at least one embodiment, an optical guide is allowed to be fastened at desired position.

Further, although a description has been given with respect to one or more embodiments of the present invention, the contents of such a description do not limit the scope of the invention.

The present application is based on and claims the benefit of priority of Japanese priority application No. 2016-133579 filed on Jul. 5, 2016, with the Japanese Patent Office, the entire contents of which are hereby incorporated by reference.

What is claimed is:

1. A ferrule, comprising:
a ferrule body having a first opening formed in a side face thereof, and having a second opening formed in a top face thereof,
wherein the first opening is configured to receive an optical waveguide inserted into the ferrule body at the side face, and
wherein the second opening is formed over and in communication with the first opening, such that the second opening connects an inner space of the first opening to an outside of the ferrule body, and
wherein a back end face of the first opening that faces toward an entrance of the first opening forms a vertical dead end at which a tip of the optical waveguide inserted into first opening stops, and the second opening is defined by a plurality of vertical inner walls, the vertical dead end being a portion of one of the vertical inner walls.

2. The ferrule as claimed in claim 1, further comprising a pressing member configured to be placed in the second opening, wherein the pressing member placed in the second opening is configured to hold the optical waveguide inserted into the first opening between the pressing member and an end face of the second opening.

3. The ferrule as claimed in claim 2, wherein the ferrule body has a step on the one of the vertical inner walls of the second opening that is configured to come in contact with an end of the optical waveguide, and a height of the step is substantially the same as a thickness of the optical waveguide.

4. The ferrule as claimed in claim 2, wherein the ferrule body has a slit into which the optical waveguide enters, and a thickness of the slit is substantially the same as a thickness of the optical waveguide.

5. The ferrule as claimed in claim 1, wherein a back end of the first opening forms a slit to receive an end of the optical waveguide, and the ferrule body has a third opening formed under and in communication with the first opening, and wherein the second opening and the third opening extending over and under the slit, respectively, at a center in a widthwise direction of the slit.

6. The ferrule as claimed in claim 1, wherein a back end of the first opening forms a slit to receive an end of the optical waveguide, and the ferrule body has a slit rib formed as a space communicating with, and wider than, the slit.

7. The ferrule as claimed in claim 1, wherein a back end of the first opening forms a slit to receive an end of the optical waveguide, and the ferrule body has a slope portion formed in the first opening and defined by an upper slope face and a lower slope face, a gap between the upper slope face and the lower slope face gradually decreasing toward the slit away from an entrance of the first opening.

8. A ferrule, comprising:
- an opening configured to receive an optical waveguide;
- a slit formed at a back of the opening to receive an end of the optical waveguide; and
- a slope portion formed in the opening and defined by an upper slope face and a lower slope face, a gap between the upper slope face and the lower slope face gradually decreasing toward the slit away from an entrance of the opening,
- wherein a slit rib is formed at, and added to, the slope portion, the slit rib being a space communicating with, and having a wider vertical span than, both the slit and part of the slope portion, and
- wherein the slit rib is formed at a widthwise center of the slope portion such that each of the upper slope face and the lower slope face of the slope portion is divided into two halves by the slit rib at the widthwise center.

* * * * *